(12) United States Patent
Guterman et al.

(10) Patent No.: US 10,268,236 B2
(45) Date of Patent: Apr. 23, 2019

(54) ELECTRONIC DEVICES HAVING VENTILATION SYSTEMS WITH ANTENNAS

(71) Applicant: Apple Inc., Cupertino, CA (US)

(72) Inventors: Jerzy S. Guterman, Mountain View, CA (US); Joel D. Barrera, Belmont, CA (US); Kevin M. Robinson, Sunnyvale, CA (US); Daniel D. Hershey, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 15/008,139

(22) Filed: Jan. 27, 2016

(65) Prior Publication Data
US 2017/0212554 A1    Jul. 27, 2017

(51) Int. Cl.
*H01Q 1/22* (2006.01)
*H01Q 9/42* (2006.01)
(Continued)

(52) U.S. Cl.
CPC .......... *G06F 1/1616* (2013.01); *G06F 1/1637* (2013.01); *G06F 1/1681* (2013.01);
(Continued)

(58) Field of Classification Search
CPC ............... H01Q 1/22–246; H01Q 1/38; H01Q 9/04–46; H01Q 9/0407; H01Q 9/0421; H01Q 9/30; H01Q 9/42
See application file for complete search history.

(56) References Cited

U.S. PATENT DOCUMENTS

| | | |
|---|---|---|
| 4,509,056 A | 4/1985 | Ploussios et al. |
| 5,258,892 A | 11/1993 | Stanton et al. |

(Continued)

FOREIGN PATENT DOCUMENTS

| | | |
|---|---|---|
| CN | 102544699 A | 7/2012 |
| CN | 102823059 A | 12/2012 |

(Continued)

OTHER PUBLICATIONS

"AirPort Product—Specific Details", AirPort Developer Note, [Online], Updated: Apr. 28, 2008, Retrieved: Sep. 25, 2008, <http://developer.apple.com/documentation/HardwareDrivers/Conceptual/Hwrech_AirportjArticles/ ElAirP_implementation.html>.

(Continued)

*Primary Examiner* — Tho G Phan
*Assistant Examiner* — Patrick R Holecek
(74) *Attorney, Agent, or Firm* — Treyz Law Group, P.C.; G. Victor Treyz; David K. Cole

(57) ABSTRACT

An electronic device may have a metal housing. The metal housing may have an upper housing in which a component such as a display is mounted and a lower housing in which a component such as a keyboard is mounted. Hinges may be used to mount the upper housing to the lower housing for rotation about a rotational axis. A slot-shaped opening may separate the upper and lower housing. Flexible printed circuits with ground traces may bisect the slot-shaped opening to form three electrically isolated slots each of which is aligned with a respective cavity antenna. The antennas may have antenna grounds formed from portions of the metal housing and other conductive structures. Resonating elements for the antennas may be supported by an elongated ventilation port structure along the rear edge of the lower housing.

12 Claims, 14 Drawing Sheets

(51) Int. Cl.
*G06F 1/16* (2006.01)
*G06F 1/20* (2006.01)
*H01Q 9/04* (2006.01)
*H01Q 1/02* (2006.01)
*H01Q 13/10* (2006.01)
*H01Q 21/28* (2006.01)

(52) U.S. Cl.
CPC ............ *G06F 1/1698* (2013.01); *G06F 1/203* (2013.01); *H01Q 1/02* (2013.01); *H01Q 1/2266* (2013.01); *H01Q 1/2291* (2013.01); *H01Q 9/0407* (2013.01); *H01Q 9/42* (2013.01); *H01Q 13/10* (2013.01); *H01Q 21/28* (2013.01)

(56) References Cited

U.S. PATENT DOCUMENTS

| | | | |
|---|---|---|---|
| 5,463,406 A | 10/1995 | Vannatta et al. | |
| 5,608,413 A | 3/1997 | Macdonald | |
| 5,784,032 A | 7/1998 | Johnston et al. | |
| 5,917,458 A | 6/1999 | Ho et al. | |
| 6,184,845 B1 | 2/2001 | Leisten et al. | |
| 6,272,356 B1 | 8/2001 | Dolman et al. | |
| 6,301,489 B1 | 10/2001 | Winstead et al. | |
| 6,307,512 B1 | 10/2001 | Geeraert | |
| 6,380,899 B1 | 4/2002 | Madsen et al. | |
| 6,392,605 B2 | 5/2002 | Anterow | |
| 6,392,610 B1 | 5/2002 | Braun et al. | |
| 6,414,643 B2 | 7/2002 | Cheng et al. | |
| 6,421,029 B1 | 7/2002 | Tanabe | |
| 6,448,942 B2 | 9/2002 | Weinberger et al. | |
| 6,456,249 B1 | 9/2002 | Johnson | |
| 6,486,836 B1 | 11/2002 | Hill | |
| 6,531,985 B1 | 3/2003 | Jones et al. | |
| 6,539,608 B2 | 4/2003 | McKinnon et al. | |
| 6,552,692 B1 | 4/2003 | Zeilinger et al. | |
| 6,570,538 B2 | 5/2003 | Vaisanen et al. | |
| 6,614,400 B2 | 9/2003 | Egorov | |
| 6,636,181 B2 | 10/2003 | Asano et al. | |
| 6,639,558 B2 | 10/2003 | Kellerman et al. | |
| 6,667,719 B2 | 12/2003 | LaKomski | |
| 6,781,546 B2 | 8/2004 | Wang et al. | |
| 6,791,506 B2 | 9/2004 | Suganthan et al. | |
| 6,819,287 B2 | 11/2004 | Sullivan et al. | |
| 6,847,329 B2 | 1/2005 | Ikegaya et al. | |
| 6,861,989 B2 | 3/2005 | Morningstar et al. | |
| 6,885,880 B1 | 4/2005 | Ali | |
| 6,987,485 B2 | 1/2006 | Ito et al. | |
| 6,995,718 B2 | 2/2006 | Fang | |
| 7,053,850 B1 | 5/2006 | Bogdans et al. | |
| 7,068,229 B2 | 6/2006 | Lin | |
| 7,181,172 B2 | 2/2007 | Sullivan et al. | |
| 7,183,983 B2 | 2/2007 | Ozden | |
| 7,339,530 B2 | 3/2008 | Ying et al. | |
| 7,345,646 B1 | 3/2008 | Lin et al. | |
| 7,447,530 B2 | 11/2008 | Iwai et al. | |
| 7,595,759 B2 | 9/2009 | Schlub et al. | |
| 7,639,190 B2 | 12/2009 | Shimasaki et al. | |
| 7,705,789 B2 | 4/2010 | Suzuki et al. | |
| 7,750,854 B2 | 7/2010 | Wedel et al. | |
| 7,768,461 B2 | 8/2010 | Cheng et al. | |
| 7,768,462 B2 | 8/2010 | Zhang et al. | |
| 7,804,458 B2 | 9/2010 | Montgomery et al. | |
| 7,916,089 B2 | 3/2011 | Schlub et al. | |
| 8,054,232 B2 | 11/2011 | Chiang et al. | |
| 8,059,039 B2 | 11/2011 | Ayala Vazquez et al. | |
| 8,059,040 B2 | 11/2011 | Ayala Vazquez et al. | |
| 8,264,412 B2 | 9/2012 | Ayala Vazquez et al. | |
| 8,269,675 B2 | 9/2012 | Kough et al. | |
| 8,319,692 B2 | 11/2012 | Chiang et al. | |
| 8,325,094 B2 | 12/2012 | Ayala Vazquez et al. | |
| 8,325,096 B2 | 12/2012 | Ayala Vazquez et al. | |
| 8,482,469 B2 | 7/2013 | Ayala Vazquez et al. | |
| 8,508,418 B2 | 8/2013 | Kough et al. | |
| 8,638,549 B2 | 1/2014 | Garelli et al. | |
| 9,203,137 B1 | 12/2015 | Gutterman et al. | |
| 9,270,014 B2* | 2/2016 | Lin | H01Q 1/243 |
| 2001/0040529 A1 | 11/2001 | Cheng | |
| 2002/0024469 A1 | 2/2002 | Masaki | |
| 2002/0080565 A1 | 6/2002 | Teshima | |
| 2002/0163473 A1 | 11/2002 | Koyama | |
| 2003/0222823 A1 | 12/2003 | Flint et al. | |
| 2004/0051670 A1 | 3/2004 | Sato | |
| 2004/0219956 A1 | 11/2004 | Iwai et al. | |
| 2004/0257283 A1 | 12/2004 | Asano et al. | |
| 2005/0041624 A1 | 2/2005 | Hui et al. | |
| 2005/0062657 A1 | 3/2005 | Lin | |
| 2006/0038736 A1 | 2/2006 | Hui et al. | |
| 2006/0145931 A1 | 7/2006 | Ranta | |
| 2006/0158379 A1 | 7/2006 | Ishimiya | |
| 2006/0238437 A1 | 10/2006 | Huang | |
| 2006/0244663 A1 | 11/2006 | Fleck et al. | |
| 2007/0069958 A1 | 3/2007 | Ozkar | |
| 2007/0126651 A1 | 6/2007 | Snyder et al. | |
| 2007/0140072 A1 | 6/2007 | Agrawal et al. | |
| 2007/0176831 A1 | 8/2007 | Lagnado et al. | |
| 2008/0018542 A1 | 1/2008 | Yamazaki et al. | |
| 2008/0106478 A1 | 5/2008 | Hill | |
| 2008/0143611 A1 | 6/2008 | Wang | |
| 2008/0166004 A1 | 7/2008 | Stanford et al. | |
| 2008/0231522 A1 | 9/2008 | Montgomery et al. | |
| 2008/0258992 A1 | 10/2008 | Tsai | |
| 2009/0051604 A1 | 2/2009 | Zhang et al. | |
| 2009/0099505 A1* | 4/2009 | Hendrixson | A61M 5/14244 604/48 |
| 2009/0153411 A1 | 6/2009 | Chiang et al. | |
| 2009/0174611 A1 | 7/2009 | Schlub et al. | |
| 2009/0174612 A1 | 7/2009 | Ayala et al. | |
| 2009/0243943 A1 | 10/2009 | Mumbru et al. | |
| 2009/0273529 A1 | 11/2009 | Liu | |
| 2010/0073241 A1 | 3/2010 | Vazquez et al. | |
| 2010/0073242 A1 | 3/2010 | Ayala Vazquez et al. | |
| 2010/0073243 A1 | 3/2010 | Vazquez et al. | |
| 2010/0134361 A1 | 6/2010 | Nakano | |
| 2010/0156741 A1 | 6/2010 | Vazquez et al. | |
| 2010/0182205 A1 | 7/2010 | Chiang | |
| 2010/0321255 A1 | 12/2010 | Kough et al. | |
| 2011/0080703 A1 | 4/2011 | Schlesener et al. | |
| 2012/0026048 A1 | 2/2012 | Vazquez et al. | |
| 2012/0050114 A1 | 3/2012 | Li et al. | |
| 2012/0050975 A1 | 3/2012 | Garelli et al. | |
| 2012/0068893 A1 | 3/2012 | Guterman et al. | |
| 2012/0074988 A1 | 3/2012 | Lashkari et al. | |
| 2012/0169550 A1 | 7/2012 | Schlub et al. | |
| 2012/0241140 A1* | 9/2012 | MacDonald | G06F 1/206 165/278 |
| 2013/0003284 A1 | 1/2013 | Massaro et al. | |
| 2013/0009833 A1 | 1/2013 | Kough et al. | |
| 2013/0050032 A1 | 2/2013 | Shiu et al. | |
| 2013/0127669 A1 | 5/2013 | Han et al. | |
| 2013/0293425 A1 | 11/2013 | Zhu et al. | |
| 2013/0321216 A1 | 12/2013 | Jervis et al. | |
| 2014/0062798 A1 | 3/2014 | Lin et al. | |
| 2014/0086441 A1 | 3/2014 | Zhu et al. | |
| 2014/0159989 A1* | 6/2014 | Malek | H01Q 1/243 343/876 |
| 2014/0184451 A1* | 7/2014 | Kuo | H01Q 1/243 343/702 |
| 2014/0361932 A1 | 12/2014 | Irci et al. | |
| 2015/0244059 A1* | 8/2015 | Onaka | H01Q 1/44 343/702 |
| 2015/0255851 A1 | 9/2015 | Guterman et al. | |
| 2015/0270598 A1 | 9/2015 | Guterman et al. | |
| 2015/0270599 A1 | 9/2015 | Guterman et al. | |
| 2015/0349401 A1 | 12/2015 | Nash et al. | |
| 2018/0022055 A1 | 1/2018 | Eriksson | |

FOREIGN PATENT DOCUMENTS

| | | |
|---|---|---|
| CN | 103457019 A | 12/2013 |
| CN | 104466368 | 3/2015 |
| EP | 1083622 | 3/2001 |

(56) References Cited

FOREIGN PATENT DOCUMENTS

| EP | 1739785 | 1/2007 |
|----|---------|--------|
| JP | 2000004120 | 7/2000 |
| JP | 2004363848 | 12/2004 |
| JP | 2006527941 | 12/2006 |
| TW | 200843205 | 11/2008 |
| WO | 2005120164 | 12/2002 |
| WO | 2004112187 | 12/2004 |
| WO | 2006018711 | 2/2006 |
| WO | 2009142000 | 11/2009 |

OTHER PUBLICATIONS

R. Brancroft, "A Commercial Perspective on the Development and Integration of an 802.11a/b/g HiperLan/WLAN Antenna into Laptop Computers" Centurion Wireless Technologies, IEEE: Antennas and Propagation Magazine. vol. 48. No. 4, Aug. 2006.
Wikipedia contributors, "MacBook Pro," Wikipedia, The Free Encyclopedia, [online] <http://en.wikipedia.org/w/index.php?title=MacBook_Pro&oldid=506131750>, retrieved Aug. 7, 2012.
Guterman et al., U.S. Appl. No. 14/640,787, filed Mar. 6, 2015.
Guterman et al., U.S. Appl. No. 14/733,839, filed Jun. 8, 2015.

* cited by examiner

US 10,268,236 B2

ELECTRONIC DEVICES HAVING VENTILATION SYSTEMS WITH ANTENNAS

BACKGROUND

This relates generally to electronic devices and, more particularly, to wireless electronic devices with antennas.

Electronic devices often include antennas. For example, cellular telephones, computers, and other devices often contain antennas for supporting wireless communications.

It can be challenging to form electronic device antenna structures with desired attributes. In some wireless devices, the presence of conductive housing structures can influence antenna performance. Antenna performance may not be satisfactory if the housing structures are not configured properly and interfere with antenna operation. Device size can also affect performance. It can be difficult to achieve desired performance levels in a compact device, particularly when the compact device has conductive housing structures.

It would therefore be desirable to be able to provide improved wireless circuitry for electronic devices.

SUMMARY

An electronic device may have a metal housing. The metal housing may have an upper housing in which a component such as a display is mounted and a lower housing in which a component such as a keyboard is mounted. Hinges may be used to mount the upper housing to the lower housing for rotation about a rotational axis.

A slot-shaped opening that extends parallel to the rotational axis may separate the upper and lower housing. Flexible printed circuits with ground traces may bisect the slot-shaped opening to form three electrically isolated slots each of which is aligned with a respective cavity antenna.

The antennas may have antenna grounds formed from portions of the metal housing and other conductive structures. Resonating elements for the antennas may be supported by an elongated ventilation port structure along the rear edge of the lower housing.

The elongated ventilation port may have ventilation port openings that permit air to flow into and out of the lower housing. Fans may be used to circulate air and thereby cool components in the electronic device.

The ventilation port structure may be formed from a dielectric such as plastic. The antenna resonating elements may be formed from metal traces on the ventilation port structure. Some of the antenna resonating element structures may run between ventilation port openings. Other antenna resonating element structures may penetrate into the ventilation port openings.

Vias may couple antenna resonating element traces on the walls of ventilation port openings and other portions of the ventilation port structure to transmission lines such as coaxial cables. Metal brackets, conductive gaskets, sheet metal members with spring fingers, and other conductive structures may be used in grounding antennas to metal portions of the electronic device housing.

DETAILED DESCRIPTION

Figure 1:
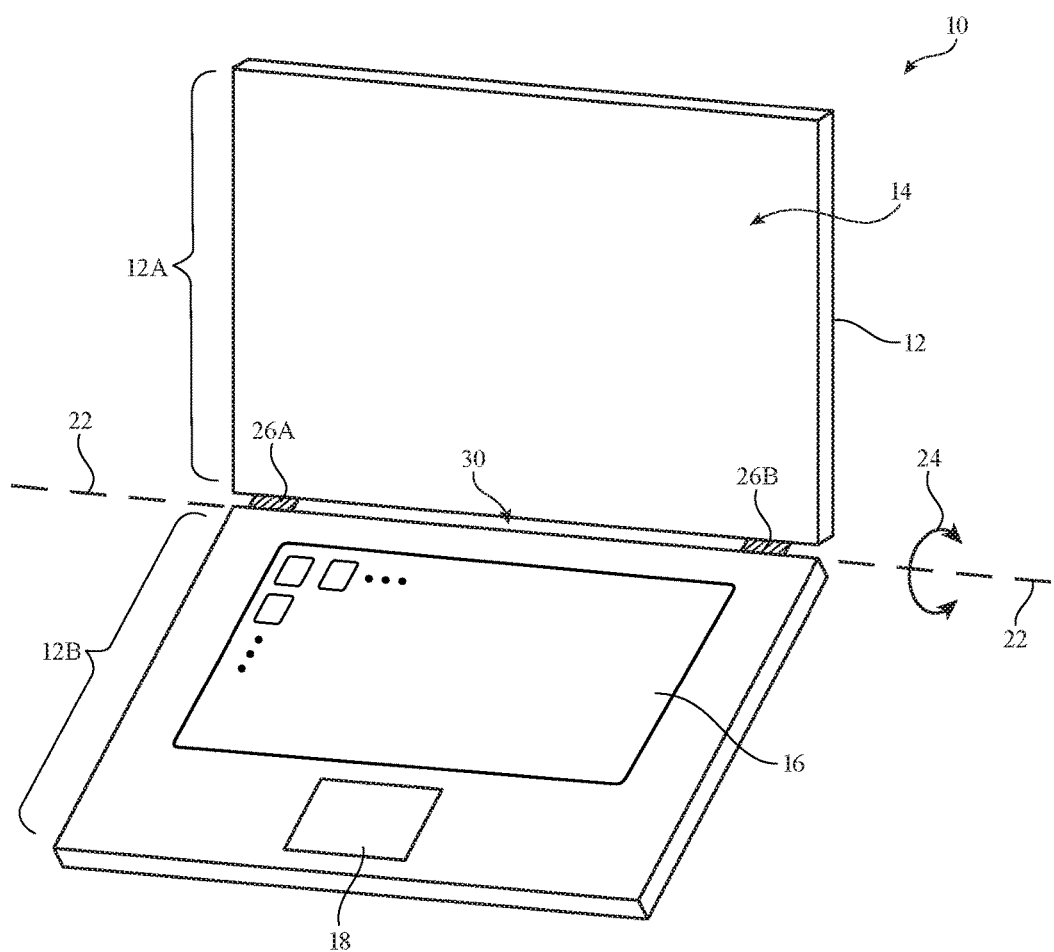
FIG. 1 is a perspective view of an illustrative electronic device such as a laptop computer in accordance with an embodiment.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications, communications at 60 GHz, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, or may be other electronic equipment. Configurations in which device 10 has a rotatable lid as in a portable computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Some of the structures in housing 12 may be conductive. For example, metal parts of housing 12 such as metal housing walls may be conductive. Other parts of housing 12 may be formed from dielectric material such as plastic, glass, ceramic, non-conducting composites, etc. To ensure that antenna structures in device 10 function properly, care should be taken when placing the antenna structures relative to the conductive portions of housing 12. If desired, portions of housing 12 may form part of the antenna structures for device 10. For example, conductive housing sidewalls may form all or part of an antenna ground. The antenna ground may include planar portions and/or portions that form one or more cavities for cavity-backed antennas. In addition to portions of housing 12, the cavities in the cavity-backed antennas may be formed from metal brackets, sheet metal members, and other internal metal structures, and/or metal traces on dielectric structures (e.g., plastic structures) in device 10. Metal traces may be formed on dielectric structures using molded interconnect device techniques (e.g., techniques for selectively plating metal traces onto regions of a plastic part that contains multiple shots of plastic with different affinities for metal), using laser direct structuring techniques (e.g., techniques in which laser light exposure is used to activate selective portions of a plastic structure for subsequent electroplating metal deposition operations), or using other metal trace deposition and patterning techniques.

As shown in FIG. 1, device 10 may have input-output devices such as track pad 18 and keyboard 16. Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26A and 26B that are located at opposing left and right sides of housing 12 along hinge axis 22. A slot-shaped opening such as opening 30 may be formed between upper housing 12A and lower housing 12B and may be bordered on either end by hinges 26A and 26B. Hinges 26, which may be formed from conductive structures such as metal structures, may allow upper housing 12A to rotate about axis 22 in directions 24 relative to lower housing 12B. Slot 30 extends along the rear edge of housing 12B parallel to axis 22. The plane of lid (upper housing) 12A and the plane of lower housing 12B may be separated by an angle that varies between 0° when the lid is closed to 90°, 140°, or more when the lid is fully opened.

Figure 2:
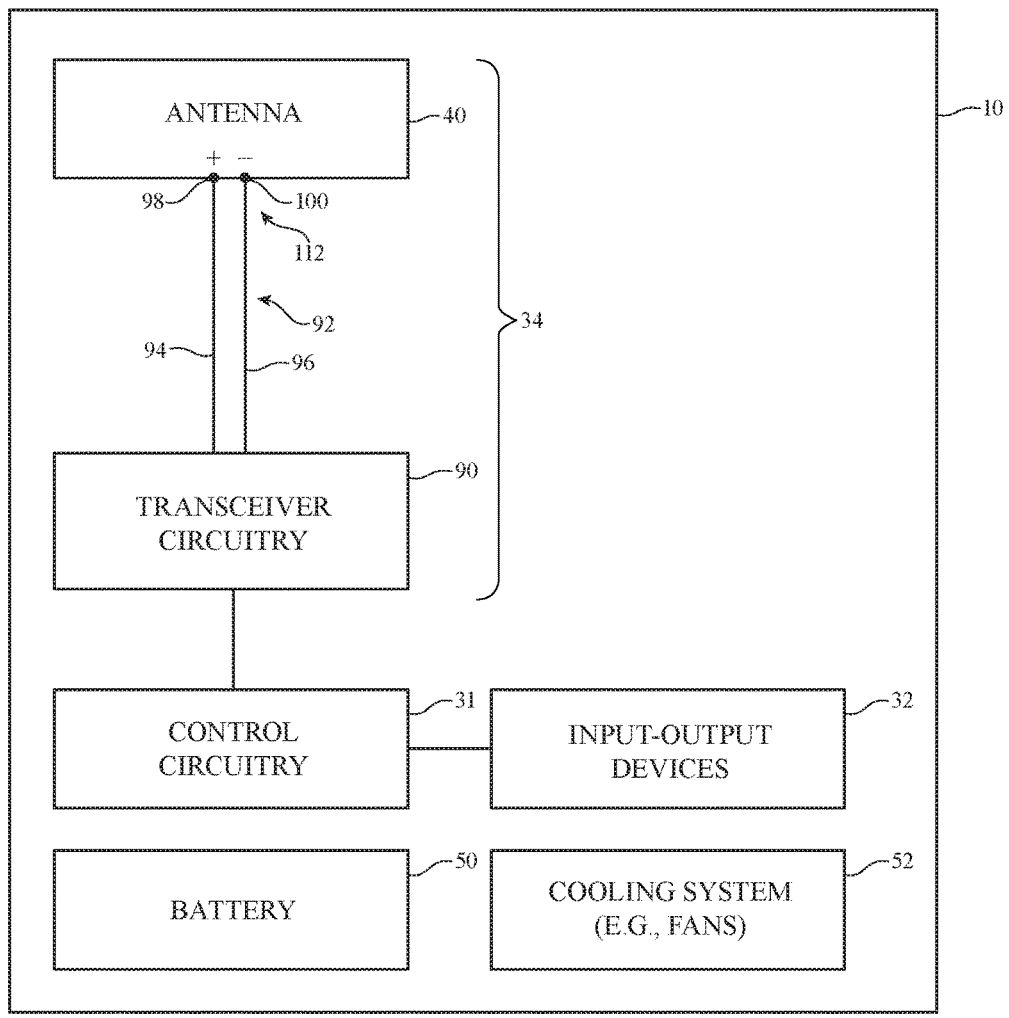
FIG. 2 is a schematic diagram of an illustrative electronic device with wireless circuitry in accordance with an embodiment.

A schematic diagram showing illustrative components that may be used in device 10 is shown in FIG. 2. As shown in FIG. 2, device 10 may include storage and processing circuitry such as control circuitry 31. Circuitry 31 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 31 may be used to control the operation of device 10. This processing circuitry may be based on one or more microprocessors, microcontrollers, digital signal processors, baseband processor integrated circuits, application specific integrated circuits, etc.

Circuitry 31 may be used to run software on device 10, such as internet browsing applications, voice-over-internet-protocol (VOIP) telephone call applications, email applications, media playback applications, operating system functions, etc. To support interactions with external equipment, circuitry 31 may be used in implementing communications protocols. Communications protocols that may be implemented using circuitry 31 include wireless local area network protocols (e.g., IEEE 802.11 protocols—sometimes referred to as WiFi®), protocols for other short-range wireless communications links such as the Bluetooth® protocol, and other wireless communications protocols.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 31 of device 10 to communicate wirelessly with external equipment. The external equipment with which device 10 communicates wirelessly may be a computer, a cellular telephone, a watch, a router or other wireless local area network equipment, a wireless base station in a cellular telephone network, a display, or other electronic equipment. Wireless communications circuitry 34 may include radio-frequency (RF) transceiver circuitry 90 and one or more antennas such as antenna 40. Configurations in which device 10 contains a single antenna may sometimes be described herein as an example.

If desired, device 10 may be supplied with a battery such as battery 50. Control circuitry 31, input-output devices 32, wireless circuitry 34, and power management circuitry associated with battery 50 may produce heat during operation. To ensure that these components are cooled satisfactorily, device 10 may be provided with a cooling system such as cooling system 52. Cooling system 52, which may sometimes be referred to as a ventilation system, may include one or more fans and other equipment for removing heat from the components of device 10. Cooling system 52 may include structures that form airflow ports (e.g., openings in ventilation port structures located along slot 30 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 52.

Radio-frequency transceiver circuitry 90 and antenna(s) 40 may be used to handle one or more radio-frequency communications bands. For example, circuitry 90 may include wireless local area network transceiver circuitry that may handle a 2.4 GHz band for WiFi® and/or Bluetooth® communications and, if desired, may include 5 GHz transceiver circuitry (e.g., for WiFi®). If desired, circuitry 90 and antenna(s) 40 may handle communications in other bands (e.g., cellular telephone bands, near field communications bands, bands at millimeter wave frequencies, etc.).

Antenna(s) 40 in wireless communications circuitry 34 may be formed using any suitable types of antenna. For example, an antenna for device 10 may include a resonating element that is formed from a loop antenna structure, a patch antenna structure, an inverted-F antenna structure, a slot antenna structure, a planar inverted-F antenna structure, a helical antenna structure, a hybrid of these structures, etc. If desired, device 10 may include cavity-backed antennas. Circuitry 31, input-output devices 32, wireless circuitry 34, and other components of device 10 may be mounted in device housing 12.

As shown in FIG. 2, transceiver circuitry 90 in wireless circuitry 34 may be coupled to antennas such as antenna 40 using paths such as transmission line path 92. Transmission line paths in device 10 such as transmission line 92 may include coaxial cable paths, microstrip transmission lines, stripline transmission lines, edge-coupled microstrip transmission lines, edge-coupled stripline transmission lines, transmission lines formed from combinations of transmission lines of these types, etc. Transmission line 92 may be coupled to antenna feed 112. Antenna 40 of FIG. 2 may, for example, form a planar inverted-F antenna, a slot antenna, a hybrid inverted-F slot antenna or other antenna having an antenna feed such as feed 112 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used and multiple antennas 40 may be provided in device 10, if desired. The illustrative feeding configuration of FIG. 2 is merely illustrative.

Filter circuitry, switching circuitry, impedance matching circuitry, and other circuitry may be interposed within transmission line 92 or other portions of wireless circuitry 34, if desired. Control circuitry 31 may be coupled to transceiver circuitry 90 and input-output devices 32. During operation, input-output devices 32 may supply output from device 10 and may receive input from sources that are external to device 10. Control circuitry 31 may use wireless circuitry 34 to transmit and receive wireless signals.

Figure 3:
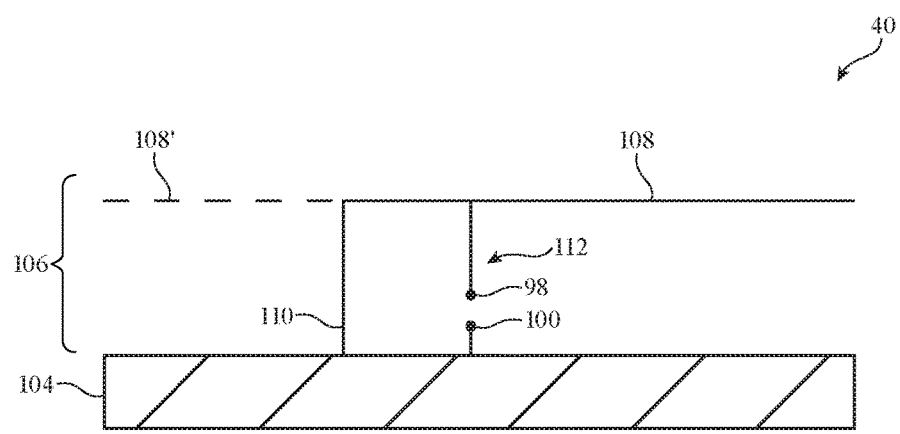
FIG. 3 is a diagram of an illustrative inverted-F antenna in accordance with an embodiment.

FIG. 3 is a schematic diagram of an illustrative antenna for device 10. In the example of FIG. 3, antenna 40 is an inverted-F antenna having inverted-F antenna resonating element 106 and antenna ground 104. Resonating element 106 may have a main resonating element arm such as arm 108. If desired, element 106 may have multiple branches (e.g., a first branch formed from arm 108, a second arm formed from branch 108', etc.). The lengths of each of the branches of element 106 may be selected to support communications band resonances at desired frequencies (e.g., a high band resonance may be supported using a shorter branch and a low band resonance may be supported using a longer branch). Antenna resonances may also be produced from resonating element harmonics and/or from using parasitic antenna resonating elements.

As shown in FIG. 3, antenna resonating element 106 (e.g., arm 108) may be coupled to ground by return path 110. Antenna feed 112 may be coupled between antenna resonating element arm 108 and ground 104 in parallel with return path 110. Antenna feed 112 may be formed from antenna feed terminals 98 and 100. Antenna feed terminal 100 may be coupled to antenna ground 104. Ground 104 may be formed from metal portions of housing 12 (e.g., portions of housing 12B), metal traces on a printed circuit or other carrier, internal metal bracket members, sheet metal members, and other conductive structures in device 10.

Figure 4:
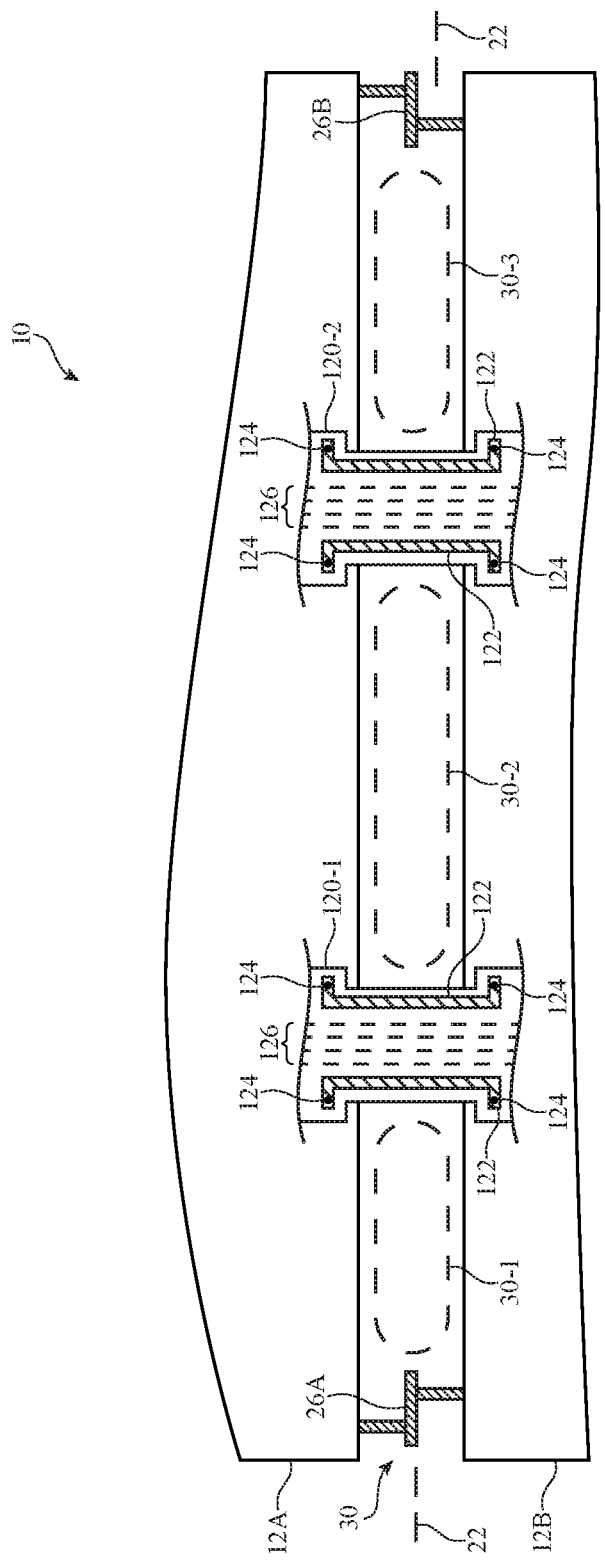
FIG. 4 is a diagram showing hinge and flexible printed circuit structures bridging a gap between upper and lower housings in a laptop computer of the type shown in FIG. 1 in accordance with an embodiment.

Metal traces on one or more flexible printed circuits may bisect slot 30. Consider, for example, the illustrative configuration of device 10 that is shown in FIG. 4. In the example of FIG. 4, housing 12A is separated from housing 12B by air-filled gap (slot) 30. Hinges 26A and 26B may be coupled between housings 12A and 12B along the respective left and right edges of device 10. Flexible printed circuits 120-1 and 120-2 may bisect slot 30 at two different locations along the length of slot 30 (i.e., at two different positions along axis 22), thereby creating three slots (i.e., three separate slot-shaped portions of slot 30) such as slots 30-1, 30-2, and 30-3.

Flexible printed circuits 120-1 and 120-2 may include signal lines 126 for routing display signals (i.e., data signals associated with displaying images on display 14) and other signals between upper housing 12A and lower housing 12B. Ground traces 122 may be provided on the outer edges of each flexible printed circuit (i.e., in each flexible printed circuit, signal lines 126 may be flanked on opposing sides by ground traces 122). Ground traces 122 may be formed from copper or other metal and may have any suitable widths (e.g., 1 mm to 3 mm, less than 1 mm, more than 1 mm, etc.). Ground traces 122 may be shorted to metal housing 12A and 12B using screws, other fasteners, welds, conductive adhesive, solder, or other conductive coupling mechanism (see, e.g., conductive ground connections 124).

With this type of arrangement, slots (openings) 30-1, 30-2, and 30-3 may be surrounded by metal. For example, slots 30-1, 30-2, and 30-3 may be surrounded by metal portions of housing 12A and 12B on their top and bottom edges. Hinges 26A and 26B and traces 122 may also be formed from metal and may help define the shapes of slots 30-1, 30-2, and 30-3. As shown in FIG. 4, slot 30-1 may have a left edge formed by hinge 26A and an opposing right edge formed from the ground traces on flexible printed circuit 120-1. Slot 30-2 may have a left edge formed from flexible printed circuit 120-1 and an opposing right edge formed from flexible printed circuit 120-2. Slot 30-3 may have a left edge formed from flexible printed circuit 120-2 (e.g., traces 122 on printed circuit 120-2) and a right edge formed from hinge 26-B.

During wireless operation of device 10, slots 30-1, 30-2, and 30-3 may serve as antenna apertures for respective electrically isolated antennas 40 in device 10. The conductive structures surrounding these slots may form cavity structures for each of the antennas 40 (e.g., cavity-shaped ground structures or other ground structures that form antenna ground 104 of FIG. 3). By forming antennas 40 using separate slots in device 10, the antennas may exhibit sufficient electrical isolation from each other to be used to form a multiple-input-multiple-output (MIMO) antenna array (e.g., at 2.4 GHz and/or 5 GHz and/or other suitable frequencies for wireless local area network communications, etc.).

Device 10 may have ventilation port structures mounted along the rear edge of housing 12B or elsewhere in device 10. The ventilation port structures may have arrays of openings that form ventilation ports. Fans in ventilation system 52 (FIG. 2) may be used to draw air into housing 12B through the openings and may be used to exhaust air that has been warmed by the circuitry in housing 12B through the openings.

Figure 5:
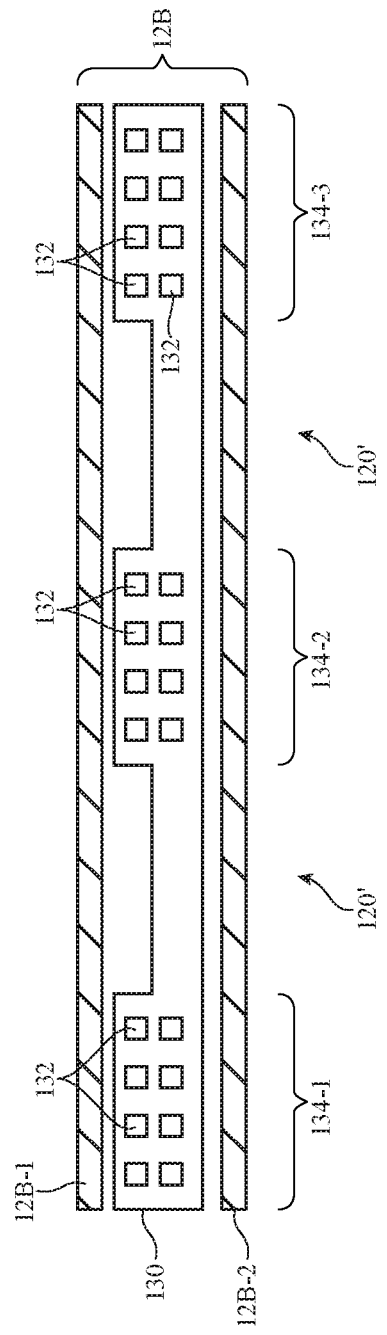
FIG. 5 is a rear view of a lower laptop computer housing having a ventilation system in accordance with an embodiment.

An illustrative ventilation port structure of the type that may be formed along the rear edge of housing 12B is shown in the rear view of housing 12B of FIG. 5. In the example of FIG. 5, lower housing 12B has upper metal housing wall 12B-1 and lower metal housing wall 12B-2. Ventilation port structure 130 is mounted along the rear edge of housing 12B between upper metal housing wall 12B-1 and lower metal housing wall 12B-2.

Ventilation port structure 130 may have ventilation port openings 132. Openings 132 may be used to allow air to enter and exit the interior of housing 12B. There may be one or more openings 132 associated with each airflow entrance location and each airflow exit location in structure 130. Openings 132 may, if desired, be arranged in arrays (e.g., arrays of 6-20 openings, more than 4 openings, fewer than 30 openings, etc.). Each array of openings 132 may form a different respective ventilation port in device 10. For example, a first array of openings 132 may form ventilation port 134-1, a second array of openings 132 may form ventilation port 134-2, and a third set of openings 132 may form ventilation port 134-3. Flexible printed circuits 120-1 and 120-2 may be interposed between the opening(s) that form the ports (see, e.g., illustrative flexible printed circuit locations 120' of FIG. 5).

Antenna structures may be supported by one or more dielectric support structures in device 10. For example, metal traces, metal foil, sheet metal structures, or other conductive structures for antenna(s) 40 may be supported on plastic structures or other dielectric structures. With one illustrative arrangement, which may sometimes be described herein as an example, some or all of the conductive structures that form antenna(s) 40 (e.g., portions of antenna resonating element 106 and/or ground 104, feed and return path structures, etc.) may be formed on a plastic structure such as ventilation port structure 130 of FIG. 5 that is also used for forming some or all of a ventilation system (e.g., system 52 of FIG. 2) for device 10.

Components such as keyboard 16 and trackpad 18 may operate through openings in upper metal housing wall 12B-1. Lower metal housing wall 12B-2, which may be joined to upper wall 12B-1 around the periphery of lower housing 12B may have feet or other support structures that allow device 10 to rest on a table top or other support structure during operation. When device 10 is being used in this way, air may flow in and out of the ventilation port openings in ventilation port structure 130 of FIG. 5.

Antenna structures for one or more of antennas 40 in device 10 may be formed from conductive structures such as metal portions of housing 12B, metal traces on a plastic carrier such as ventilation port structure 130, and metal members such as brackets and sheet metal members. Consider, as an example, antenna 40 of FIG. 6. An antenna with a configuration of the type shown by antenna 40 of FIG. 6 may be mounted within housing 12B in alignment with slot 30-1 and/or slot 30-3 (as examples).

Figure 6:
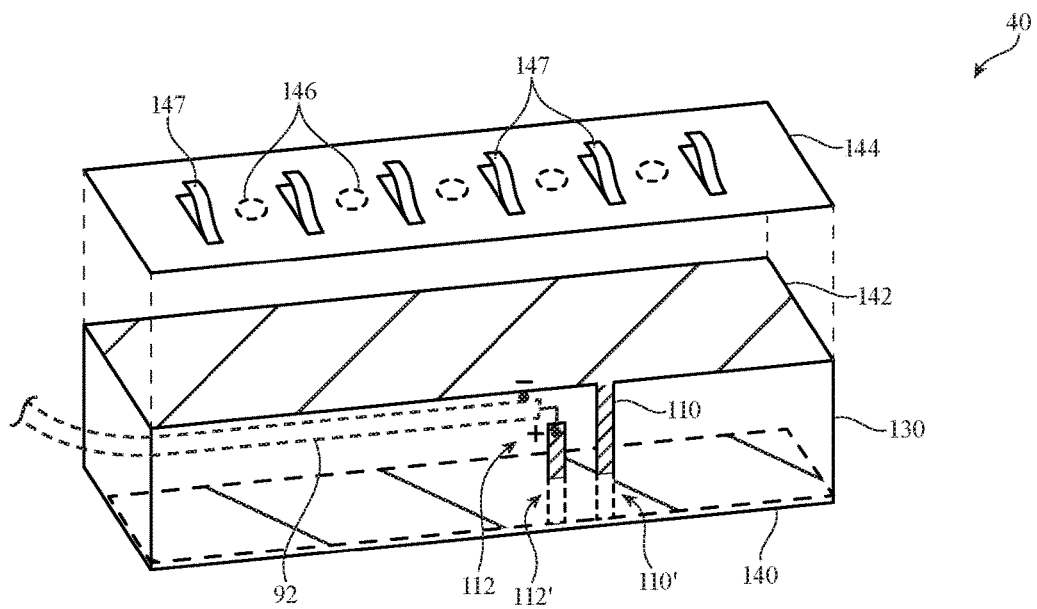
FIG. 6 is a perspective view of an illustrative antenna structure having a sheet metal member with spring fingers for grounding an antenna to a metal housing wall in accordance with an embodiment.

As shown in the exploded perspective view of FIG. 6, antenna 40 may have metal traces 140 and 142. Metal traces 140 may be patterned to form an antenna resonating element arm (see, e.g., inverted-F antenna resonating element arm 108 of FIG. 3). Metal traces 142 may be used in forming antenna ground 104. In the example of FIG. 6, metal traces 140 are formed on a surface of a portion of ventilation port structure 130 and metal traces 142 are formed on an opposing surface of structure 130. Sheet metal member 144 may be mounted to metal traces 142. Solder joints 146 or other conductive attachment structures may be used in electrically coupling sheet metal member 144 to metal traces 142. Sheet metal member 144 may have fingers 147 that form spring structures (springs). These spring structures may bear against an inner portion of housing 12B to short metal member 144 and therefore traces 142 to housing 12B (e.g., to form antenna ground 104).

Figure 7:
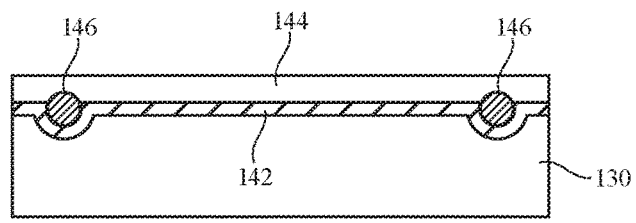
FIG. 7 is a cross-sectional side view of a portion of an illustrative antenna structure showing how a sheet metal ground structure may be coupled to metal traces on a plastic carrier using a ring of solder in accordance with an embodiment.

Antenna 40 of FIG. 6 may be fed using a coaxial cable or other transmission line 92 that is coupled to antenna 40 at feed 112. Return path 110 may be formed from metal traces that extend along the surface of structure 130 between metal traces 140 and 142. Portions of the feed path for feed 112 and portions of return path 110 may be formed using vias that pass through structure 130 (see, e.g., vias 112' and 110'). If desired, solder 146 may be formed in a ring shape that helps attach the periphery of metal member 144 to metal traces 142 on the surface of support 130, as shown in the illustrative cross-sectional side view of FIG. 7.

Figure 8:
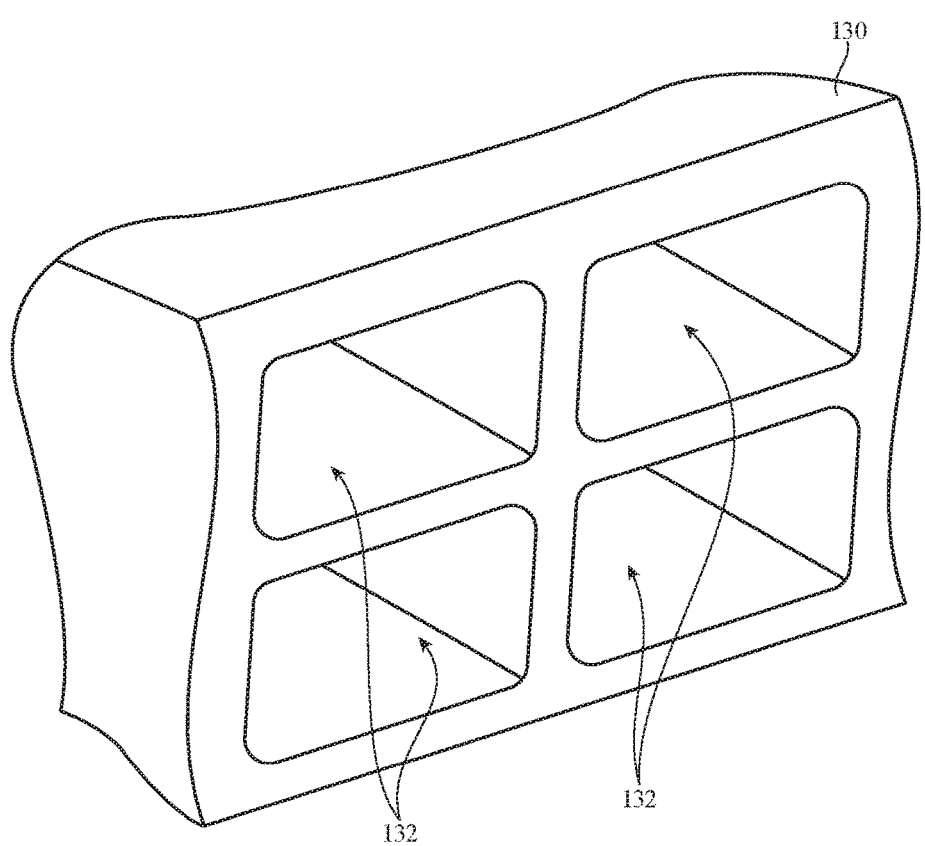
FIG. 8 is a perspective view of an illustrative ventilation port structure that may serve as an antenna carrier for an electronic device in accordance with an embodiment.

FIG. 8 is a perspective view of a portion of ventilation port structure 130 showing how openings 132 may be provided in structure 130 to allow air to flow into and out of device 10. In the example of FIG. 8, openings 132 have rectangular outlines. This is merely illustrative. Any suitable shapes (circular, oval, triangular, etc.) may be used in forming openings 132.

Figure 9:
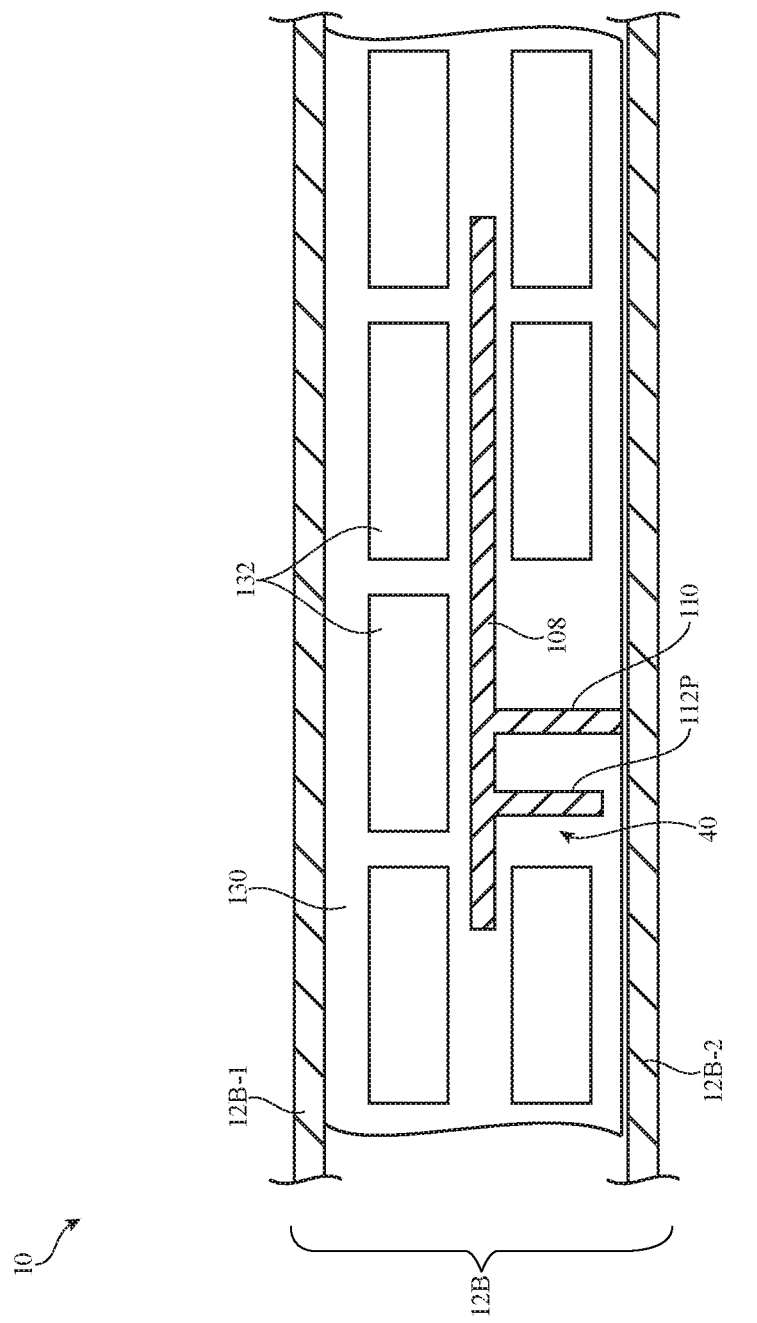
FIG. 9 is a rear view of an illustrative lower housing in a laptop computer that has a ventilation port structure that serves as an antenna carrier in accordance with an embodiment.

FIG. 9 is a side view of the rear of housing 12B showing how ventilation port structure 130 may be mounted between walls 12B-1 and 12B-2 of lower housing 12B along the rear edge of housing 12B. Metal traces may be patterned on ventilation port structure to form portions of antenna 40 (e.g., to form antenna structures such as some or all of antenna resonating element arm 108, feed 112, return path 110, and antenna ground 104). In the example of FIG. 9, openings 132 form an array with rows and columns and one of openings 132 has been omitted to provide additional area on the exterior surface of ventilation port structure. Some of antenna 40 (e.g., feed path 112P for feed 112 and return path 110) may extend into the area that would otherwise be occupied by the omitted opening. Other portions of antenna 40 (e.g., arm 108) may extend along the wall portions of ventilation port structure 130 that separate respective openings 132 from each other.

Figure 10:
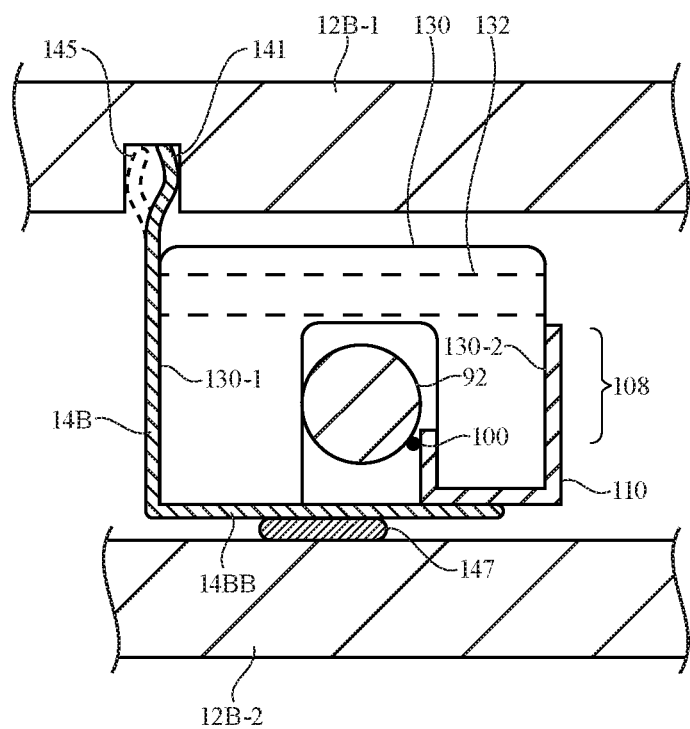
FIG. 10 is a cross-sectional side view of a rear portion of an illustrative lower laptop computer housing showing how a bracket may be used in grounding antenna structures to the housing in accordance with an embodiment.

FIG. 10 is a cross-sectional end view of an antenna such as antenna 40 of FIG. 9. As shown in FIG. 10, openings such as illustrative opening 132 may pass through ventilation port structure 130 from interior ventilation port structure surface 130-1 to exterior ventilation port structure surface 130-2. Metal traces for antenna resonating element arm 108 and return path 110 may be formed on surface 130-2. Return path 110 may extend under structure 130 and may contact a ground path in a coaxial cable or other transmission line 92 at terminal 100. Metal bracket 143 may have a wavy portion that runs parallel to axis 22 within a groove 145 in housing wall 12B-1 that extends parallel to axis 22. As shown in FIG. 10, wavy bracket portion 141 may be compressed within groove 145 of housing wall 12B-1 to short bracket 143 to housing 12B-1. Portion 140B of bracket 143 may be shorted to housing wall 12B-2 by conductive material 147 (e.g., solder, welds, conductive adhesive, a conductive fastener, a conductive gasket formed from conductive foam, solid conductive elastomeric material, and/or conductive fabric, etc.). Housing 12B-1, housing 12B-2, and metal bracket 143 may be used in forming antenna ground 104. Antenna such as antenna 40 of FIGS. 9 and 10 may be mounted in the portion of device 10 associated with slot 30-2 or other portions of device 10.

Figure 11:
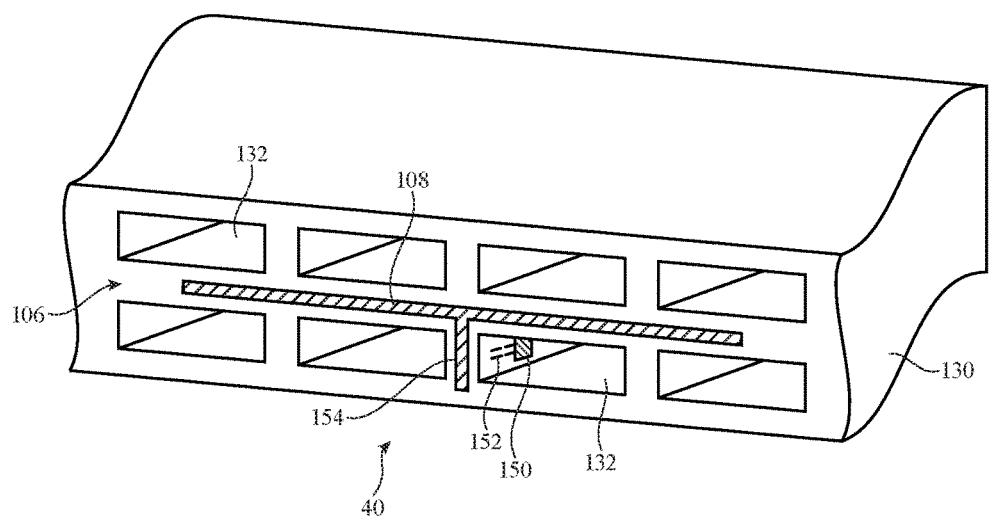
FIG. 11 is a perspective view of an illustrative ventilation port structure having antenna resonating element traces that penetrate at least partly into a ventilation port opening in accordance with an embodiment.

Another illustrative arrangement for forming antenna 40 from metal traces on support structure 130 is shown in FIG. 11. With the arrangement of FIG. 11, some metal traces such as metal trace 150 are formed on the inner wall surfaces of one or more of openings 132. Vias such as via 152 may, if desired, be formed through walls in structure 130 (e.g., to couple trace 150 to other portions of antenna 40). Vias such as via 152 may, in general, be used to couple together metal traces in resonating element 106 (e.g., in arm 108), in feed 112, in return path 110, in ground 104, or in other portions of antenna 40.

In the example of FIG. 11, resonating element 106 has a main arm (arm 108) that extends along the surface of structure 130 between rows of openings 132. Metal traces such as portion 154 of arm 108 may be provided to tune the performance of antenna 40 (e.g., to adjust antenna bandwidth, resonance frequency, etc.). For example, portion 154 may be increased in length to increase the length of arm 108 and/or to increase capacitive coupling between the tip of portion 154 and ground (housing wall 12B-2), thereby decreasing the resonant frequency of antenna 40. If desired, metal traces such as trace 154 of FIG. 11 may be used in forming feed structures, return path structures, and/or antenna ground structures. Metal trace 154 may, if desired, be coupled to other structures in antenna 40 using one or more vias that pass through structure 130.

By using metal traces on the inner surfaces of openings 132 such as trace 150, the amount surface area used for the traces of antenna resonating element 106 can be increased without omitting any of openings 132 (e.g., to adjust antenna performance by providing an antenna resonating element arm of sufficient length, to enhance antenna bandwidth, etc.). Configurations in which metal antenna traces penetrate into openings 132 and in which one or more openings 132 are omitted from structure 130 to provide additional area for antenna 40 may also be used. The configuration of FIG. 11 is merely illustrative.

Figure 12:
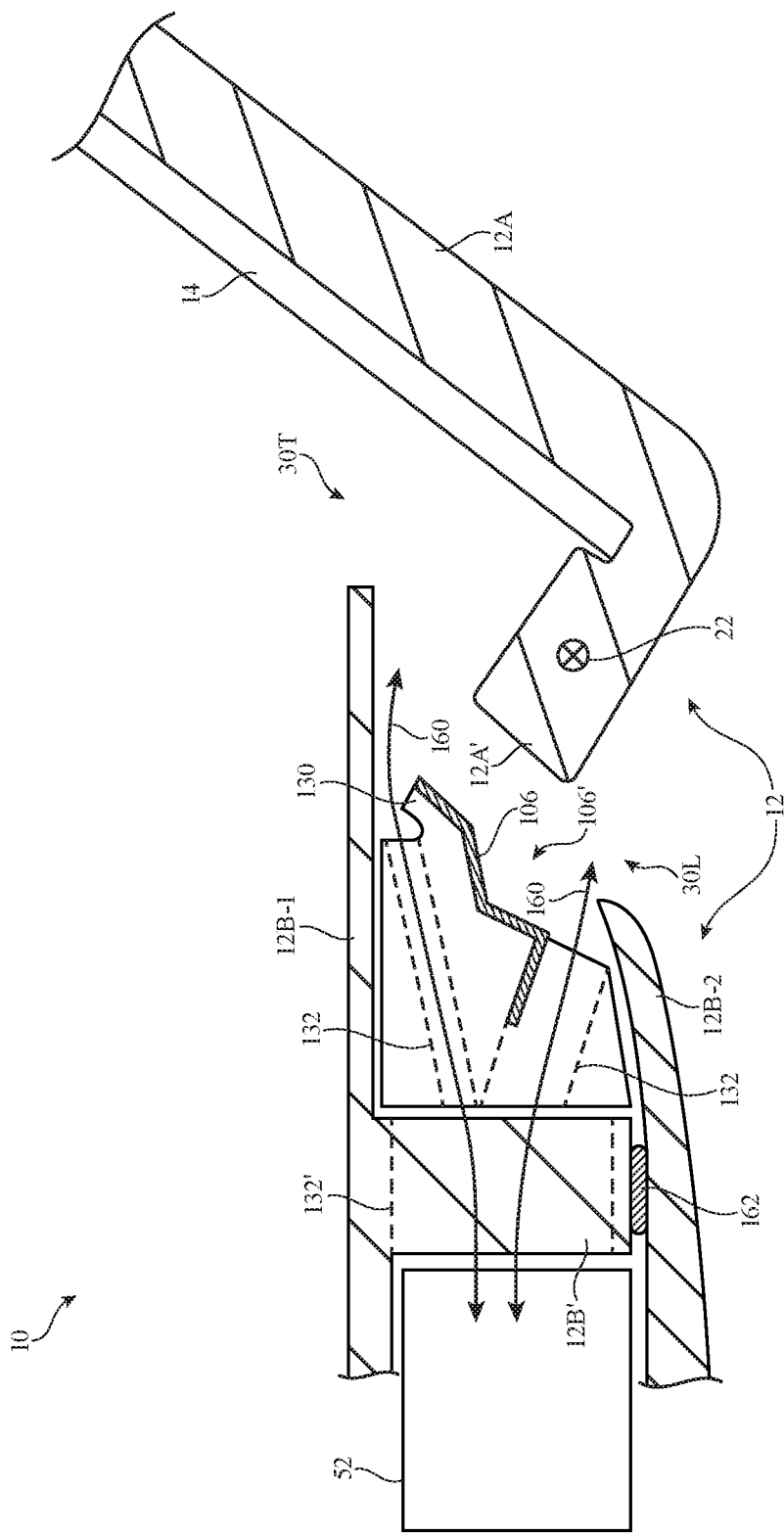
FIG. 12 is a cross-sectional side view of an illustrative laptop computer with antennas supported on a ventilation port structure in accordance with an embodiment.

A cross-sectional side view of device 10 in the vicinity of the rear edge of housing 12B is shown in FIG. 12. As shown in FIG. 12, fans and other cooling system structures (ventilation system structures 52) may be mounted within the interior of lower housing 12B. Portion 12B' of upper wall 12B-1 may be electrically coupled to lower housing wall 12B-2 using conductive structure 162. Conductive structures 162 may be a conductive gasket formed from conductive foam, conductive fabric, a solid elastomeric conductive material, or other conductive material. Opening 132' may be provided in portion 12B' to form an air passageway (ventilation opening) that is aligned with openings 132 in ventilation port structure 130.

Antenna structures such as antenna resonating element 106 may be formed from metal traces on the exterior surface of ventilation port structure 130. Ventilation port structure 130 may have a recessed portion (e.g., a step-shaped recess that creates an inward bend in the outermost surface of port structure 130) so that portion 106' of antenna resonating element 106 is relatively far away from adjacent metal structures such as metal portion 12' of upper housing 12A, thereby enhancing antenna bandwidth. When upper housing 12A is in a closed position, antenna signals can be transmitted and received through lower slot portion 30L of slot 30. When upper housing 12A is in an open position (as shown in FIG. 12), antenna signals can be transmitted and received both through upper slot portion 30T and through lower slot portion 30L.

Figure 13:
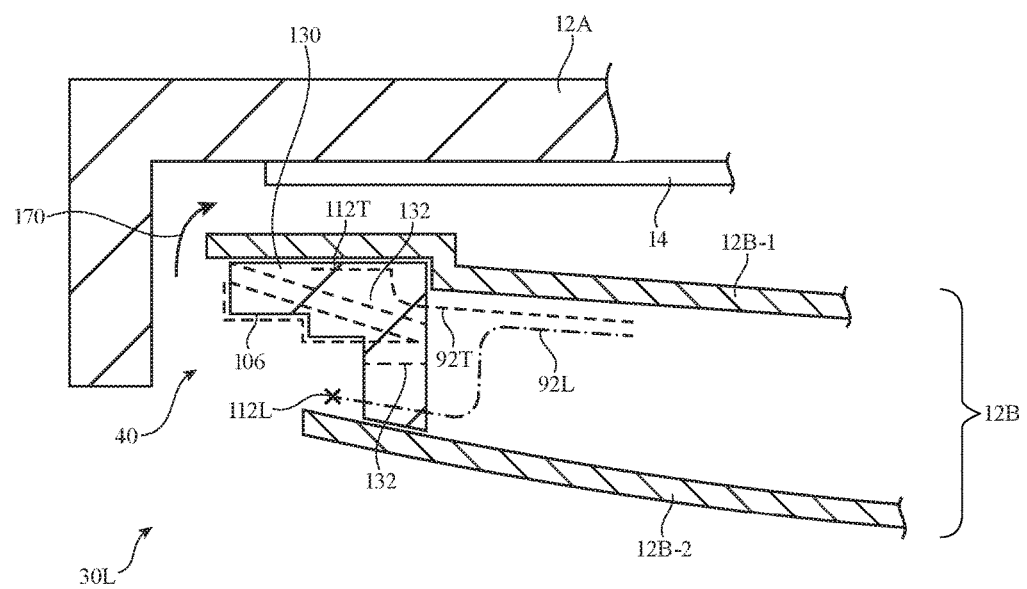
FIG. 13 is a cross-sectional side view of an illustrative rear portion of the lower housing of a laptop computer with antenna structures mounted on a ventilation port structure in accordance with an embodiment.

A cross-sectional side view of device 10 when lid (upper housing) 12A is in a closed position is shown in FIG. 13. As shown in FIG. 13, antenna resonating element 106 may be fed at an upper feed location such as location 112T (e.g., using a transmission line such as transmission line 92T) or may be fed at a lower feed location such as location 112L (e.g., using a transmission line such as transmission line 92L). The location of the feed for antenna 40 may be selected to help enhance antenna efficiency. In some configurations, placement of the feed for antenna 40 in location 112L may help enhance antenna signal transmission and reception through lower slot portion 30T between housings 12A and 12B and may minimize undesired antenna signal leakage along path 170. In general, however, the feed for antenna 40 may be located at any suitable portion of antenna 40. The configurations of FIG. 13 are merely illustrative.

Figure 14:
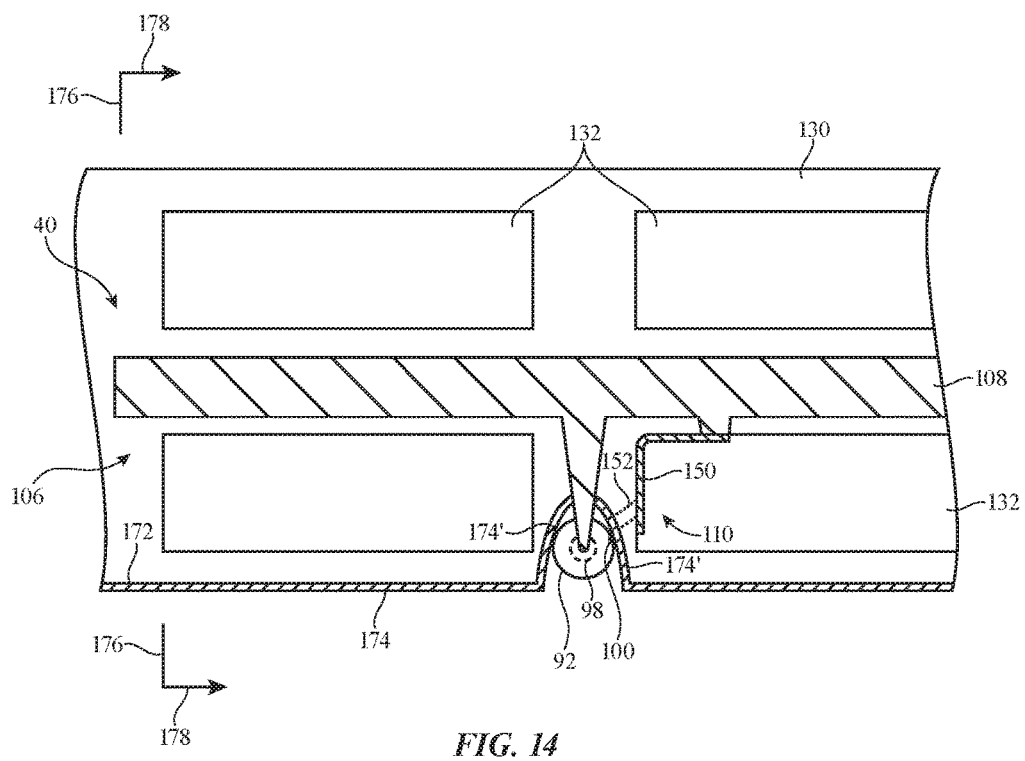
FIG. 14 is a side view of a ventilation port structure that is supporting an antenna resonating element in accordance with an embodiment.

FIG. 14 is a side view of antenna 40 in an illustrative configuration in which antenna resonating element 106 has an arm 108 formed from metal traces that are supported by the portions of ventilation port support 130 between respective ventilation port openings 132. Metal trace 150 is formed on the inner surface of one of openings 132 and is coupled to via 152. Via 152 electrically connects trace 150 (which serves as return path 110 in the example of FIG. 14) to metal trace portion 174' of metal trace 174. Metal trace 174 serves as part of antenna ground 104 and may be formed on surface 172 of ventilation port structure 130. A coaxial cable or other transmission line 92 may have a positive signal line coupled to positive antenna feed terminal (e.g., through a via coupled to a portion of a trace extending from arm 108) and may have a ground signal line coupled to ground antenna feed terminal 100 on trace portion 174'.

Figure 15:
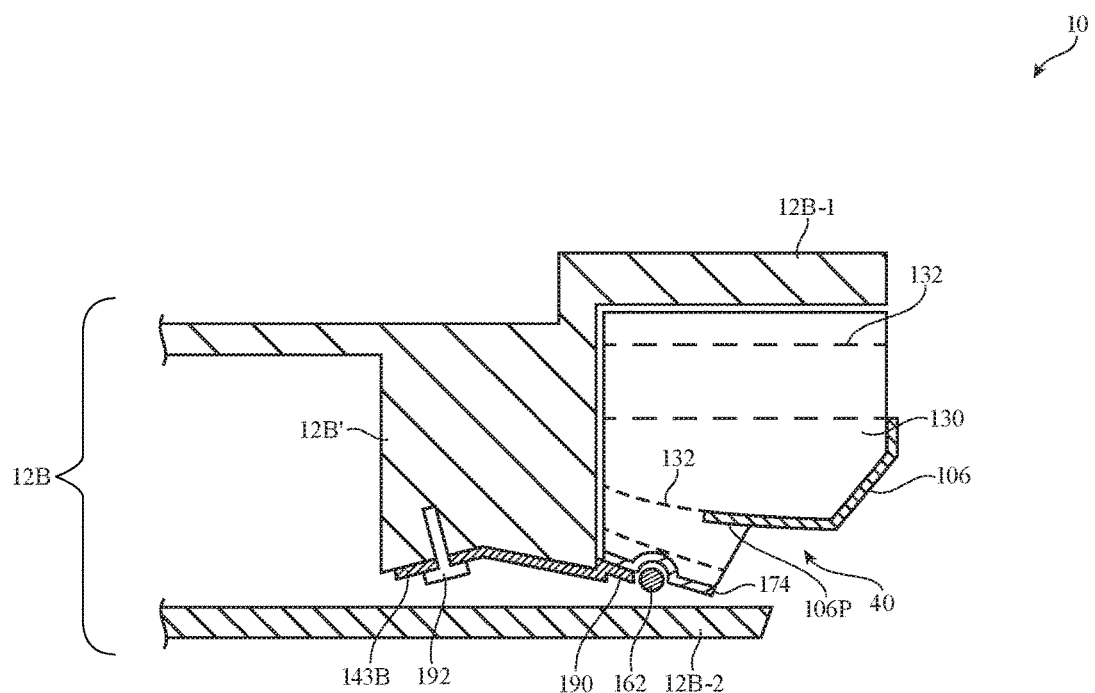
FIG. 15 is a cross-sectional side view of a ventilation port structure that is supporting an antenna resonating element in accordance with an embodiment.

A cross-sectional view of an antenna such as antenna 40 of FIG. 14 taken along line 176 and viewed in direction 178 is shown in FIG. 15. In the illustrative configuration of FIG. 15, metal bracket 143B is attached to portion 12B' of housing wall 12B-1 and is shorted to housing wall 12B-1 using screw 192. Bracket 143B may be coupled to trace 174 at node 190 (e.g., by direct contact, using conductive material such as solder or conductive adhesive, using welds, fasteners, or using other conductive structures). Conductive gasket 162 may be used to short metal trace 174 to the inner surface of housing wall 12B-2. Antenna 40 may have metal traces that protrude into one or more ventilation port openings 132 (see, e.g., portion 106P of antenna resonating element 106).

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   a housing having walls separating an interior from an exterior, wherein at least one of the walls has an opening;
   a plastic structure mounted in the interior of the housing having at least one ventilation port opening, wherein the at least one ventilation port opening is defined by at least one wall that surrounds the opening and the at least one ventilation port opening at least partially overlaps the opening in the housing;
   a fan that directs air through the ventilation port opening; and
   an antenna resonating element on the plastic structure, wherein the antenna resonating element includes a metal trace on the plastic structure, wherein the metal trace has a portion that extends into the ventilation port opening, and wherein the metal trace is coupled to the at least one wall.

2. The apparatus defined in claim 1 wherein the ventilation port opening comprises one of a plurality of ventilation port openings and wherein the metal trace comprises an arm that extends between the ventilation port openings.

3. The apparatus defined in claim 1 wherein the walls are metal housing walls, the apparatus further comprising:
   an additional housing;
   a display in the additional housing;
   a metal member having fingers that short the metal trace to at least one of the metal housing walls; and
   first and second flexible printed circuits that extend across an opening between the housing and the additional housing to form first, second, and third slot-shaped openings between the housing and the additional housing.

4. The apparatus defined in claim 1 further comprising a metal-filled via that passes through the at least one wall and that is coupled to the metal trace.

5. An electronic device, comprising:
   a metal housing;
   electrical components in the metal housing;
   a plastic ventilation port structure having a plurality of ventilation port openings;
   a fan in the metal housing that directs air through the ventilation port openings;
   an inverted-F antenna resonating element for a first antenna formed from a metal trace on the plastic ventilation port structure; and
   a second antenna resonating element for a second antenna on the ventilation port structure.

6. The electronic device defined in claim 5 wherein a portion of the metal trace extends into at least one of the ventilation port openings.

7. The electronic device defined in claim 6 further comprising a metal-filled via that passes through a portion of the plastic ventilation port structure and that is coupled to the metal trace.

8. The electronic device defined in claim 5 further comprising a conductive gasket that extends between the metal housing and the metal trace.

9. The electronic device defined in claim 5 further comprising additional metal traces that form a third antenna resonating element on the ventilation port structure for a third antenna.

10. The electronic device defined in claim 5 wherein at least a portion of the inverted-F antenna resonating element is formed between the ventilation port openings.

11. An electronic device, comprising:
    a metal housing;
    electrical components in the metal housing;
    a plastic ventilation port structure having a plurality of ventilation port openings;
    a fan in the metal housing that directs air through the ventilation port openings;
    an antenna resonating element formed from a metal trace on the plastic ventilation port structure, wherein the metal trace forms a first antenna resonating element for a first antenna;
    additional metal traces that form second and third antenna resonating elements on the ventilation port structure for respective second and third antennas;
    a first flexible printed circuit between the first and second antennas; and
    a second flexible printed circuit between the second and third antennas.

12. The electronic device defined in claim 11 further comprising:
    a display, wherein the first and second flexible printed circuits include signal lines and wherein at least one of the signal lines carries signals for the display.

* * * * *